July 13, 1965    L. PÉRAS    3,194,579
TRIM CORRECTING DEVICES FOR VEHICLES EQUIPPED
WITH A HYDRAULIC-CORRECTION SUSPENSION SYSTEM
Filed April 24, 1963    3 Sheets-Sheet 1

Inventor
Lucien Peras
By Stevens, Davis, Miller & Mosher
Attorneys

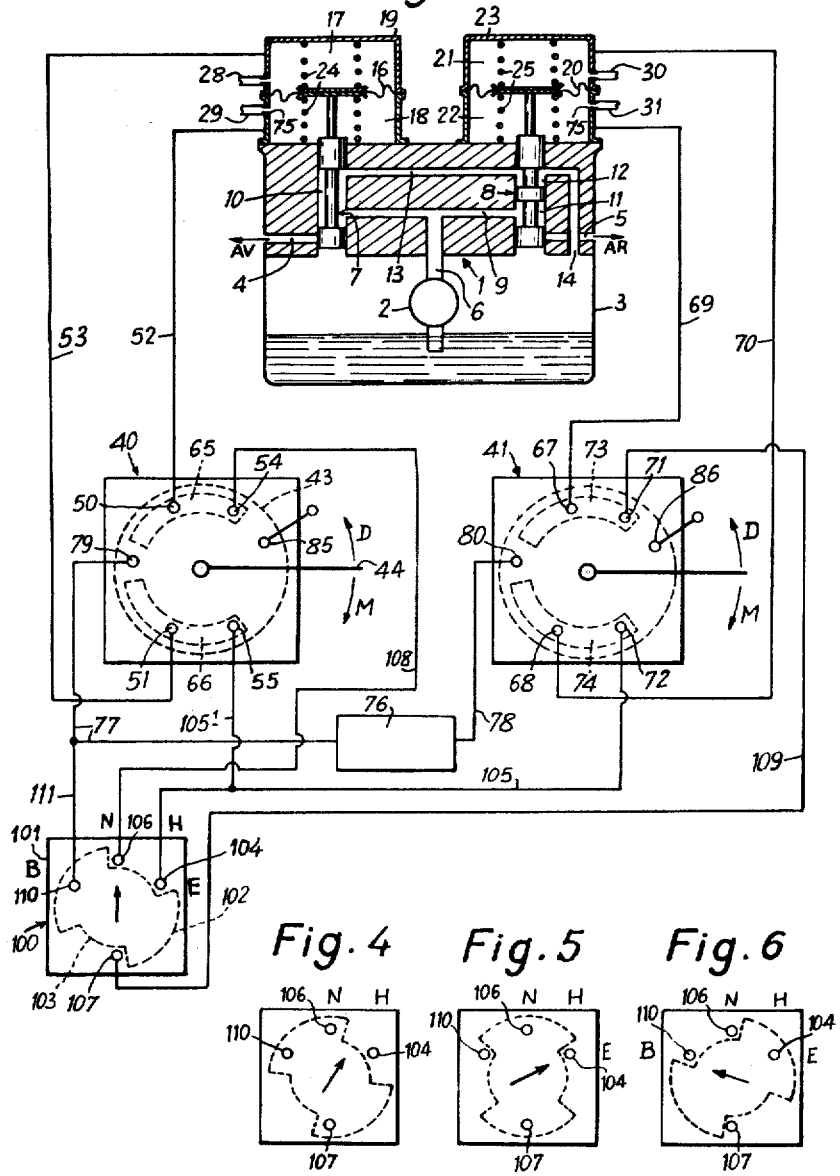

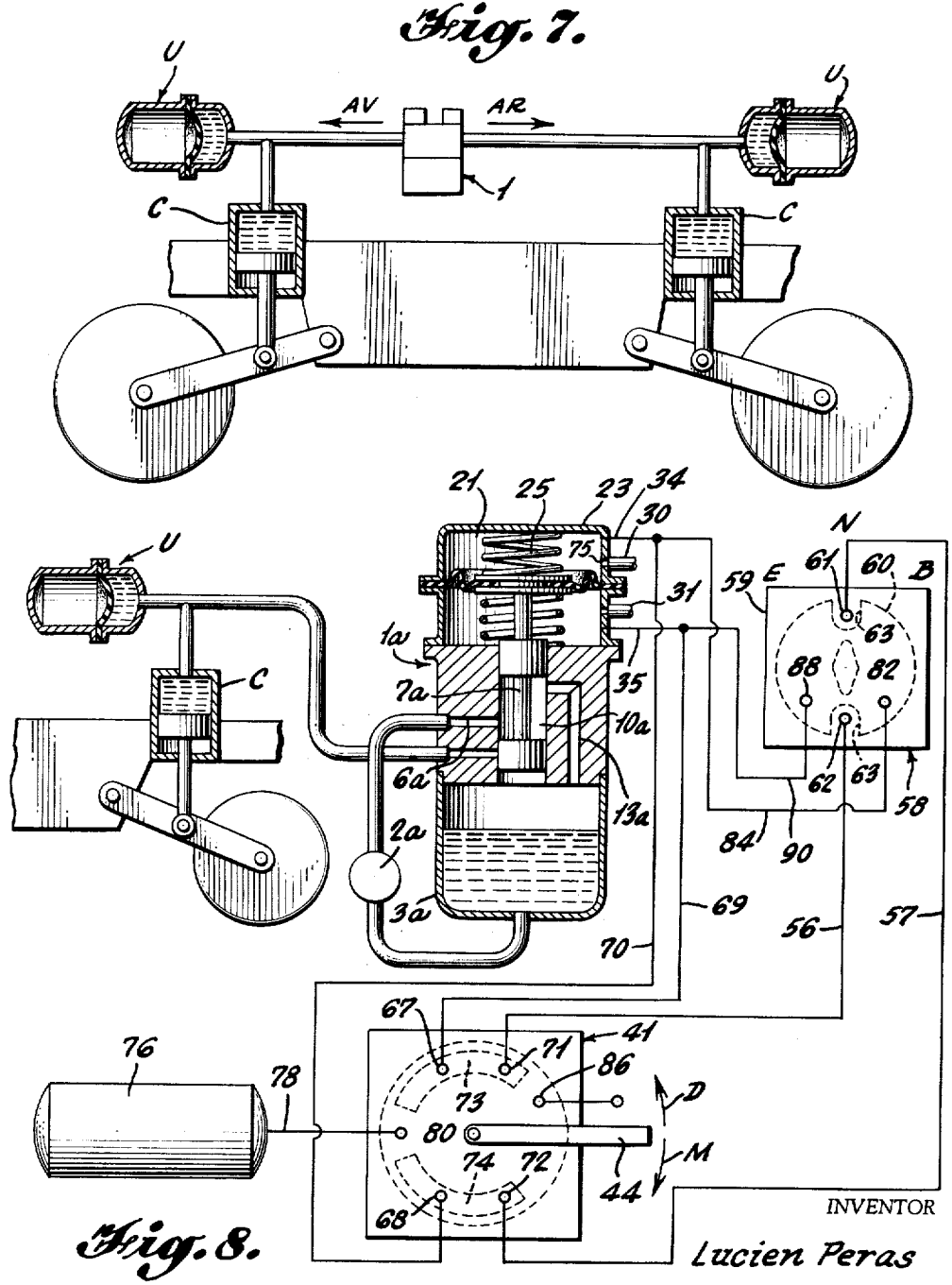

United States Patent Office 3,194,579
Patented July 13, 1965

3,194,579
TRIM CORRECTING DEVICES FOR VEHICLES EQUIPPED WITH A HYDRAULIC-CORRECTION SUSPENSION SYSTEM
Lucien Peras, Billancourt, France, assignor to Regie Nationale des Usines Renault, Billancourt, France
Filed Apr. 24, 1963, Ser. No. 275,296
Claims priority, application France, Apr. 27, 1962, 895,992, Patent 1,329,076; June 27, 1962, 902,214, Patent 81,834
6 Claims. (Cl. 280—104)

In a vehicle equipped with a suspension system incorporating means for hydraulically correcting the trim it is known to control the filling of the hydraulic elements for correcting the level of the wheel suspension elements by means of a distributor operatively connected through kinematic means to the suspension elements, the arrangement comprising as a rule a distributor for the front axle and another distributor for the rear axle. However, this arrangement is attended by the inconvenience of necessitating a complicated pipe-line system, notably three pipe lines between the distributor and the source of fluid under pressure (feed line, return line to the reservoir and leakage recovery line) and, moreover, the kinematic distributor operatively connected to the wheel suspension elements is normally actuated unnecessarily as a consequence of wheel beat or oscillation, thus causing abnormal wear and tear.

It has already been proposed to combine the distributor and the hydraulic pressure source into a single unit and to provide remote control means for operating this unit by means of an auxiliary circuit with the assistance notably of the engine suction and of means responsive to the level of the vehicle body for adjusting the action of said auxiliary circuit.

This invention is also concerned with a device for correcting the trim in a vehicle equipped with a distributor combined into a single remote-controlled unit with the source of hydraulic pressure, and the invention is further concerned with a simple form of embodiment of the distribution system and with a specific form of embodiment of the means for controlling said distribution system which is particularly suitable for adequately and desiredly timing or retarding the distributor control action while maintaining said distributor in a neutral position in which the trim correcting hydraulic elements are isolated therefrom.

More particularly, this invention aims at providing a device for correcting the trim of a vehicle wherein the suspension system of at least one axle comprises hydraulic correcting elements, this device comprising a distributor connected to a source of hydraulic fluid under pressure, to a reservoir and to said hydraulic correcting elements, the movable member of said distributor being adapted to assume a position wherein said hydraulic correcting elements are hydraulically isolated, said position being intermediate a load position in which said distributor connects said hydraulic pressure source with said correcting elements and an exhaust position in which said elements are connected to said reservoir, and means responsive to the level or vertical position of the vehicle body above the ground for controlling the movable member of said distributor, characterized in that said movable member of said distributor is urged toward said first position by means of an element movable in an enclosure divided into two chambers by said elements, each chamber being constantly connected with a suction duct and also with the atmosphere under the control of means responsive to the level of the vehicle body, which means are adapted, when said level departs from a predetermined height value, to discontinue the venting of either of said chambers to the atmosphere in order to actuate said movable distributor member in the direction tending to maintain said predetermined level.

In order to afford a clearer understanding of the present invention and of the manner in which the same may be carried out in practice, reference will now be made to a typical form of embodiment of the trim correcting device of this invention, which is illustrated diagrammatically in the accompanying drawings, in which:

FIGURE 3 is a diagrammic view showing the hydraulic distributor and the auxiliary control circuit therefor;

FIGURES 4, 5 and 6 are detail views showing the different operative positions of the selector valve;

FIGURE 7 is a diagrammatic view illustrating the relationship of the distributor of the present invention to the front and rear axle of a vehicle;

FIGURE 8 is a diagram showing the hydraulic system associated with an auxiliary control circuit for a single axle of a vehicle.

Figure 1:
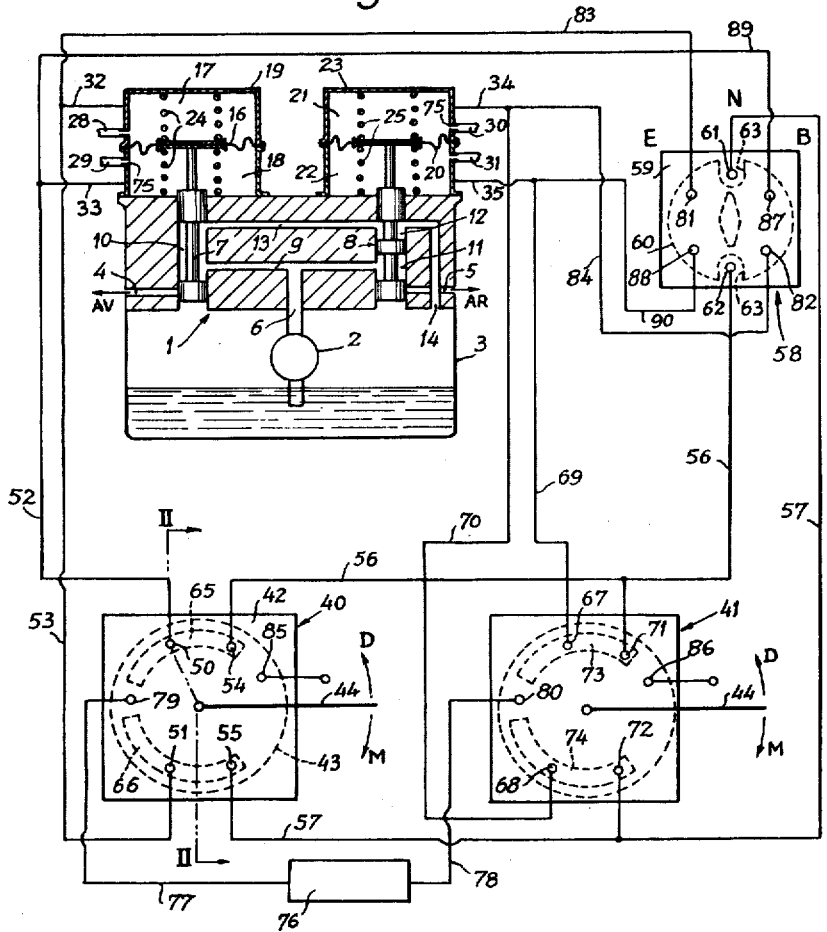
FIGURE 1 is a diagram showing the hydraulic system associated with an auxiliary control circuit therefor.

The trim correcting device illustrated in FIG. 1 comprises a hydraulic distributor designated generally by the reference numeral 1 and associated with a hydraulic pump shown diagrammatically on a considerably smaller scale at 2, the distributor and pump assembly being incorporated into a reservoir 3. The function of this distributor is to control the degree of filling of hydraulic elements provided for correcting the level of front and rear suspension systems, the outlet port 4 of the distributor being connected to the front suspension as shown by the arrow AV, while the other outlet port 5 is connected to the rear suspension as shown by the arrow AR.

As already known by those skilled in the art, these correcting elements may consist of hydraulic cylinders mounted in series with the suspension springs, notably the hydraulic cylinders of hydropneumatic suspension units. As illustrated in FIGURE 7, the distributor 1 is connected with front and rear hydraulic correcting cylinders C and hydropneumatic suspension units U, as indicated by the arrows AV, AR, respectively.

Moreover, as the correcting elements of the front suspension are interconnected (the same also applying to the rear suspension), the ports 4, 5 may be connected in the direction of the arrows AV and AR through a single pipe line with the pipe line interconnecting the corresponding correcting elements.

The pump 2 is connected to the feed port 6 of distributor 1 and the latter comprises, for the front suspension, a control slide valve 7, and for the rear suspension another control slide valve 8.

These slide valves 7, 8 are normally urged (as shown in the drawings and as will be explained presently) to an intermediate or mean position wherein they isolate said correcting elements hydraulically, by closing the inner ends of ports 4 and 5. In addition, the feed port 6 communicates with a duct 9 opening permanently on the one hand into the annular space 10 provided between said slide valve 7 and its surrounding wall, and on the other hand into a similar annular space 11 provided between the other slide valve 8 and its surrounding wall. Moreover, this last-named slide valve 8 provides in its cylinder another annular space normally communicating with the annular space 10 of slide valve 7 through a duct 13, and also with the reservoir 3 through another duct 14, whereby the pump 2 is normally discharged to the reservoir through one of these ducts. This arrangement is such that when any one or both slide valves 7, 8 is or are moved downwards from the position in which they are shown in FIG. 1, the pump discharge duct (whether through 13 or 14) is closed while connecting one or both outlet ports 4, 5 with the pump 2. On the other hand, any upward movement of any one or both slide valves 7, 8 will connect any one or both outlet ports 4, 5 and therefore the relevant correcting elements to the reservoir, while leaving the pump discharge duct open.

It is clear notably that if the source of hydraulic pressure consisted in the known manner of a pressure accumulator charged by a pump having in this case an exhaust port upstream of the pressure accumulator, the exhaust ports 13, 14 could be dispensed with, provided only that the slide valves 7, 8 constitute fluid-receiving annular spaces such as 10, 11 connected through said duct 6 to said pressure accumulator.

The distributor slide valve 7 is operatively connected through an axial rod to a flexible diaphragm 16 dividing a sealed enclosure 19 into two chambers 17, 18, this enclosure being fluid-tight relative to the external medium. Likewise, the slide valve 8 is connected through an axial rod to a flexible diaphragm 20 dividing another sealed enclosure 23 into two chambers 21, 22. The diaphragms 16, 20 carry in their central region rigid discs formed with bent marginal portions for receiving one end of opposite springs 24, 25 constantly urging said slide valves 7, 8 of the distributor to the aforesaid intermediate or mean position. The four chambers 17, 18 and 21, 22 are connected through pipe lines 28, 29 and 30, 31 to a source of vacuum or suction, for example the induction manifold of the vehicle engine (not shown). Moreover, these chambers 17, 18 and 21, 22 are connected through pipe lines 32, 33 and 34, 35 to devices adapted to vent same to the atmosphere with a view to operate the slide valves 7, 8 of the distributor as a function of the selected vehicle trim.

A first group of these devices consists of a pair of multi-way valves 40, 41 responsive to the level of the vehicle body above the ground normally to the front axle (valve 40) and normally to the rear axle (valve 41). Each valve consists essentially, as shown diagrammatically in FIG. 1, of a slide-face plate 42 in which a plurality of ports (to be described presently in detail) are formed, this assembly being shown in thick lines, and of a rotary valve member 43 bearing with a flat face against said slide-face plate 42, the slide face of each valve being formed with arched grooves co-operating with said ports (said valve member being shown in broken lines in FIG. 1).

In this example the slide-face plate 42 is adapted to be secured on the vehicle body and the rotary valve member 43 is adapted to be connected through an arm 44 to a component element of the front or rear suspension system which is movable as a function of the wheel beat occurring in the relevant axle.

In the known fashion this arm 44 may be connected to the center of the axle concerned if the suspension is of the axle type, and if an independent wheel suspension system is contemplated this arm may be connected to a link disposed centrally of a transverse torsion bar interconnecting the two wheels of the axle, for example the anti-roll bar as in conventional suspension systems.

Figure 2:
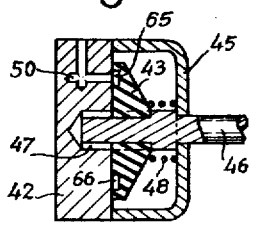
FIGURE 2 is an axial section showing a typical form of embodiment of a valve incorporated in the aforesaid control circuit.

In the example illustrated in FIG. 2, this rotary valve assembly comprises a slide-face plate 42 associated with a case 45, and central apertures formed in said plate 42 and case 45 constitute bearing means for mounting and retaining a shaft 46 rigidly connected through splines 47 with the rotary valve member 43 of resilient material, this valve member being constantly urged by a compression coil spring 48 against the slide face of 42, said spring reacting against the inner wall of case 45. The aforesaid arm 44 is wedged or keyed on shaft 46.

The slide face of valve 40 has formed therein a pair of ducts 50, 51 connected through pipe lines 52, 53 respectively to the aforesaid lines 33, 32 leading into the control chambers 18, 17 of the distributor slide valve 7. It is also provided with a pair of ducts 54, 55 connected through lines 56, 57 respectively to a hand-controlled selector valve 58 having a function to be described presently, this valve 58 being also shown herein as being of the type comprising a fixed slide-face plate 59 and a rotary valve 60 shown in broken lines. The slide face 59 is formed with a pair of ducts 61, 62 connected to pipe lines 56, 57 respectively. This valve 60 is formed with a pair of opposite peripheral notches 63 adapted, in the normal position N of the valve illustrated in the drawings, to vent the ducts 61, 62 to the atmosphere.

On the other hand, the valve member 43 of valve 40 is formed with a pair of arched grooves 65, 66 adapted, through a relatively narrow range of vertical positions of the front end of the vehicle body, to interconnect certain ducts; the former, the ducts 50 and 54, and, the latter, ducts 51 and 55, as shown in FIG. 1. These grooves 65, 66 are furthermore so disposed that according to its direction of angular movement the rotary valve member closes either duct 54 or duct 55 through which, as just ascertained, the control chambers 18 and 17 of the distributor slide valve 7 are vented to the atmosphere, respectively. The slide face of valve 41 is likewise provided with ducts 67, 68 connected through lines 69, 70 to lines 35, 34 opening into the control chambers 22, 21 of the other distributor slide valve 8. The slide face of this valve is also provided with a pair of ducts 71, 72 connected respectively through pipe lines 56, 57 to the selector valve 58. The valve member of this selector valve 58 is formed with a pair of arched grooves 73, 74 co-operating with ducts 67, 71 and 68, 72 under the same conditions as those set forth hereinabove in connection with valve 40. Other features of this specific form of embodiment of the device for correcting the trim of a vehicle will be set forth and evidenced as the description of the mode of operation of the device proceeds in a later part of this specification.

A first mode of operation, which is the normal mode of operation of this device, is that providing an automatic correction of the vehicle trim which is responsive to the valves 40 and 41; in this case, valve 58 is set in the normal position N wherein the ducts 54, 55 and 71, 72 of valves 40 and 41 are vented to the atmosphere, uselessly and therefore without any bearing on the mode of operation to be described hereinafter.

The positions of the valves 40, 41 which are shown in FIG. 1 in their mean position corresponding to a predetermined level or height of the vehicle body both at the front end and at the rear end thereof, the vehicle standing still, so that, as already pointed out, they vent to the atmosphere the control chambers 17, 18 and 21, 22 of the distributor slide valves.

If as a consequence of an increase in the vehicle load involving a lowering of the vehicle body at the front and rear ends, the arms 44 of valves 40, 41 are moved upwards in the direction of the arrows D until the grooves 65 and 73 of the valves cease to overlap the ports 54 and 71 of these valves, the chambers 18 and 22 being then positively vacuumized with respect to the other chambers 17 and 21 still connected to the atmosphere. Thus, slide valves 7, 8 are moved downwards as seen in FIG. 1, and the pump exhaust ports 13, 14 are closed while ports 4 and 5 are opened, whereby the front and rear hydraulic level correcting elements of the vehicle raise the vehicle body until the front and rear valves 40, 41 are restored to their initial mean position due to the movement of arms 44 in a direction opposite to that shown by the arrow D.

Conversely, when the load of the vehicle is reduced so that the vehicle body is caused to rise both at the front end and at the rear end, the arms 44 of valves 40, 41 are moved downwards in the direction of the arrows M, and when the grooves 66 and 74 of the rotary valve member do not overlap the ducts 55 and 72 any more, chambers 17 and 21 are positively vacuumized in relation to chambers 18, 22 remaining connected to the atmosphere. Thus, the slide valves 7, 8 are moved upwards as seen in FIG. 1, and the pump exhaust ducts 13, 14 are open as well as ducts 4, 5 through which the hydraulic correcting elements of the front and rear suspensions are discharged to the reservoir 3. This is attended by a downward movement of the vehicle body until the valves 40, 41 are restored in their initial mean position corresponding to the predetermined height or level of the vehicle body.

It will be noted that the trim correction is characterized by a complete independence between the front and rear suspensions; in other words, the correcting elements of one suspension may be pressurized while exhausting those of the other suspension.

Of course, this trim correction may also be applied to the suspension of only one vehicle axle. Such an embodiment is illustrated in FIGURE 8 and it is to be understood that this system can be applied to either the front or rear axle or to independent wheels of a vehicle, as before. The hydraulic correcting cylinder C and the suspension unit U are connected to the device of the invention, as illustrated, with equivalent elements in this figure being designated by the same reference numerals as used in FIGURE 1. For example, it will be noted that the parts of the distributor 1a, required for this embodiment include the same numerals as the front axle distributor of FIGURE 1 plus the suffix "a" for further indentification, while the control circuit elements bear reference numerals of the elements used to control the rear axle in the embodiment of FIGURE 1. It will be clear that this embodiment operates in the same manner as the front axle trim correcting means of FIGURE 1 when the rear axle trim correcting means of that figure is not operating for some reason.

It will be noted that this distributor control arrangement utilizing an auxiliary circuit permits of introducing a proper time-lag in the displacements of the distributor slide valves outside their normal mean position by providing in this case fine jets 75 in pipe lines 28, 29 and 30, 31, so that a certain time elapses after the ducts for venting the control chambers 17 or 18, or 21 or 22 to the atmosphere are closed by valves 40, 41, whereby the suction or vacuum necessary for moving the slide valves 7 or 8 can build up therein. On the other hand, the slide valves are returned at a relatively rapid rate to their normal mean position, for atmospheric air will enter without being appreciably retarded through the valves 40 and 41 when the normal trim of the vehicle is restored. This time-lag introduced into the slide valve movements avoids any pumping (beat or oscillation) phenomenon when the vehicle body is being restored to its normal trim, and also prevents any undesired or untimely operation of the distributor during the suspension beat.

On the other hand, when the vehicle engine is not running, or if the vacuum available is relatively low, the springs 24, 25 hold the slide valves of the distributor in their mean position whereat the correcting elements are hydraulically isolated.

However, means are also provided to permit the restoring of the normal trim of the vehicle body when the vacuum or suction available is too low or null, for example when it is desired to reset the normal trim of the vehicle body subsequent to a loading or unloading thereof, or when the vehicle is running, for instance when driving on long uphill roads with the accelerator throttle wide open. To this end, a vacuum reservoir 76 is connected through pipe lines 77, 78 to ducts 79, 80 formed in the slide faces of valves 40, 41, these ducts being so disposed as to lie between the grooves 65, 66 and 73, 74 when said slide valves are in their position shown in FIGURE 1, which is the position corresponding to the normal trim of the vehicle. When, as a consequence of a change in the vehicle trim, the arms 44 of the slide-face valves are moved in the direction D or M, the ducts 79 and 80 are disposed under either of grooves 65, 66 or 73, 74, after discontinuing the venting to the atmosphere, as normally effected by these valves, and it is clear that the vacuum reservoir 76 is thus able to take over the action previously exerted by the suction taken from the induction manifold of the engine, fine jets being also provided in pipe lines 77, 78 for preserving the time-lag characteristic in the control of the aforesaid slide valves.

It will be noted that the height of the vehicle body which is obtained automatically at the front and rear ends of the vehicle by the operation of the valves 40, 41 is predetermined as a function of the mounting adjustment of these valves, and may thus be rendered adjustable at will by altering notably the connection between the arms 44 and the movable elements of the corresponding suspensions, this connection having for instance a length variable for this purpose.

However, the selector valve 58, outside its normal position N corresponding to the predetermined automatic trim correction, is adapted to provide at will and in a relatively simple manner either an exceptionally high trim position (position E of said valve) or a discharge position for the aforesaid correcting elements (position B of said valve).

When this valve 58 is moved from position N to position E, the valve 60 closes the ducts 61, 62 for venting the valves 40, 41 to the atmosphere and its notches 63 open the two venting ducts 81, 82 respectively connected through lines 83, 84 and 32, 34 to chambers 17 and 21 controlling the slide valves 7 and 8. Since only these chambers 17, 21 are now vented to the atmosphere, the valves 7 and 8 are moved downwards in relation to FIG. 1, and as a result the hydraulic correcting elements are loaded via the ducts 4 and 5. Thus, the body of the vehicle rises, the arms 44 of valves 40, 41 move in the direction M, and the upward movement of the body is discontinued when the grooves 65, 73 formed in the rotary valve members of slide-face valves 40, 41 overlap the venting ducts 85, 86 formed in the slide faces of these valves in a position corresponding to the desired shift between the normal position and said exceptional trim position.

The position B of the selector valve 58 (in which the hydraulic correcting elements are discharged (is used notably for changing a wheel according to the known method permitted by this suspension system, which consists in this case in raising the vehicle body to the exceptionally high position, subsequently wedging the vehicle body vertically and finally discharging the correcting elements in order to lift the desired wheel above the ground.

When the valve 58 is turned to position B, valve member 60 closes ports 61, 62 and 81, 82, its notches 63 uncovering two venting ports 87, 88 connected respectively via pipe lines 89, 90 and 33, 35 to chambers 18, 22 controlling the slide valve 7 and 8. Under these conditions, only chambers 18, 22 are then vented to the atmosphere, and slide valves 7, 8 are moved upwards in relation to their position of FIG. 1, and as a result the desired hydraulic correcting elements are discharged to the proper degree via the ducts 4 and 5 of the distributor.

Of course, it will be noted that within the scope of this invention the trim detection may also be accomplished by means of electrical devices acting in this case as remote control means providing through solenoid-operated valves a fluid connection between the control chambers of the distributor and the atmosphere.

The alternate form of embodiment illustrated in FIGS. 3 to 6 of the drawings exemplifies a modified arrangement wherein the selector valve is only caused to co-operate with the valves responsive to the height or level of the vehicle body; although this arrangement is simpler than the preceding one, it provides an additional intermediate-trim position between said normal position and the aforesaid exceptionally high position, that is, a position affording a greater ground clearance than usual in case of need, whereas the so-called "exceptional" position may correspond to the maximum height of the vehicle which is permitted by the suspension rebound straps or pads, and the lowermost position to a discharge of the correcting elements of the suspension until the rebound check pads engage each other, these last two positions permitting notably as already known of changing wheels without resorting to lifting jacks.

In this form of embodiment, the arrangement of distributor 1 and valves 40, 41 is substantially the same as in the preceding example, and identical parts are designated by the same reference numerals.

The selector valve 100 comprises a fixed slide face 101 in which a plurality of ports described hereinafter in detail are formed (assembly shown in thick lines) and a hand-actuated rotary valve member 102 (shown in broken lines) having arched notches 103 formed along its outer periphery for venting to the atmosphere, according to the angular position of the rotary valve member, certain among the ports formed in the slide face 101 on a common circle centered on the axis of rotation of the valve member.

The slide face 101 comprises a port 104 connected through pipe lines 105, 105¹ with the ports 55 and 72 of valves 40 and 41, respectively. It is also provided with a port 110 leading via a pipe line 111 into one of the pipe lines, namely pipe line 77, connecting the vacuum reservoir 76 to the ports 79 and 80 of valves 40, 41.

This trim correcting device operates as follows:

A first form of operation corresponding to the usual operation of the vehicle is that wherein the valve member of the selector valve 100 is in its normal position N shown in FIG. 3. In this position N the rotary valve member 103 opens the ports 104, 106 and 107 through which the ports 55, 72 and 54, 71 of valves 40, 41 are vented to the atmosphere.

In FIG. 3 the valves 40, 41 are shown in their mean position corresponding to the predetermined normal level of the front and rear ends of the vehicle body, thus ensuring, in conjunction with the selector valve 100, the venting of the control chambers 17, 18 and 21, 22 of the distributor slide valves to the atmosphere, these slide valves being in this case in their mean position whereby the correcting elements connected to ports 4 and 5 are hydraulically isolated.

If, as a consequenec of an increase in the vehicle load which causes the vehicle body to sink at both front and rear ends, the arms 44 of valves 40, 41 are moved upwards in the direction of the arrows D until the grooves 65, 73 of these valves cease to overlap the ports 54 and 71, the chambers 18 and 22 are vacuumized in relation to chambers 17 and 21 still connected to the atmosphere. Thus, the slide valves 7 and 8 are moved downwards (as seen in FIG. 3) and close the pump discharge passage (ducts 13 and 14) while opening ducts 4 and 5, whereby the hydraulic elements for correcting the level at the front and rear ends of the vehicle body will raise the latter until the front and rear valves 40, 41 are restored in their initial mean position due to the movements of arms 44 in a direction opposite to the arrows D.

Conversely, when the vehicle load is reduced, thus causing the front and rear ends of the vehicle body to move upwards, the arms 44 of valves 40, 41 are moved in the direction of the arrow M, and when the ports 55 and 72 are no more covered by the grooves 66, 74 of the rotary valve members the control chambers 17 and 21 are subjected to a certain degree of vacuum in relation to the other control chambers 18, 22 still connected to the atmosphere. Under these conditions, both slide valves 7, 8 are moved upwards (FIG. 3), thus leaving the pump discharge passage 13, 14 open and further opening the ducts 4, 5 through which the front and rear hydraulic suspension correcting elements are discharged to the reservoir 3. This causes the vehicle body to be lowered until the valves 40, 41 are restored to their initial mean position corresponding to the predetermined level or height of the vehicle body.

As already pointed out hereinabove, the fine jets 75 disposed in lines 28, 29, 30 and 31 introduce a certain time-lag in the movements of the distributor slide valves outside their normal position. Moreover, when the aforesaid movements of the valve members of valves 40, 41 take place, immediately as the venting effect produced by these valves ceases, the grooves 65, 66 or 73, 74 overlap the ports 79, 80 and thus the vacuum reservoir 76 can make up any possible lack of engine suction, the port 110 of selector valve 100 being covered by the valve member 102 in position N. The reservoir 76 is normally vacuumized during the operation of the vehicle by the suspension beat or oscillation via the valves 40, 41 when the arched grooves of these valves overlap the ports 79, 80.

A second, so-called "high" position, providing a ground clearance greater than normal, for example when driving off the road or for cleaning an obstacle, is obtained by switching the rotary valve member of selector valve 100 to position H as shown in FIG. 4.

In this position H, the valve member 102 uncovers only port 104 of the selector valve; in other words, assuming that the vehicle is in its normal position, the ducts 55, 72 and therefore chambers 17, 21 are vented to the atmosphere, and valve 102 closes ports 106, 107, thus discontinuing the venting of ports 54, 71 and therefore of chambers 18, 22 to the atmosphere, so that the engine suction is communicated to these two chambers. As a result, slide valves 7, 8 of distributor 1 are moved downwards in relation to their position of FIG. 1, thus connecting the pump with ducts 4, 5 for charging the hydraulic correcting elements of the suspension system. The vehicle body is thus lifted and the arms 44 of the rotary valve members of valves 40, 41 rotate in the direction M until the rotary movement of these valve members, by closing the ports 55 and 72, causes the engine suction to be also communicated to chambers 17 and 21, whereby the springs 25 will restore the slide valves 7, 8 to their mean position. Consequently, the vehicle trim is maintained at the desired raised level. It will be noted that when the ports 55, 72 are closed as just disclosed, the grooves 66, 74 of the rotary valve members cause the ports 51, 68 to be connected to the ports 79; 80 connected in turn to the vacuum reservoir 76, without causing any alternation whatsoever in the above described operation which is stopped when the slide valves 7, 8 of the distributor resume their normal mean position, port 110 of selector valve 100 remaining closed in position H of this selector valve.

A third, so-called "exceptional" position corresponding notably to the maximum height of the vehicle body permitted by the rebound straps or pads of the suspension system is obtained by moving the rotary valve member 103 of selector valve 100 to position E as shown in FIG. 5.

In this position E the valve member opens the ports 104, 110 of the selector valve assuming that the vehicle body is in its normal position, the venting of port 104 to the atmosphere and the closing of ports 106, 107 of the selector valve will firstly move the vehicle body to its raised position as just set forth in connection with the description of the H position, the rotary members of valves 40, 41 rotating in the direction of the arrow M. But, in addition, the venting of port 110 to the atmosphere is attended by the same effect as far as the vacuum reservoir 76 and ports 79, 80 of valves 40, 41 are concerned so that the initial venting of chambers 17, 21 produced via ports 51, 55 and 68, 72 of valves 40, 41 is maintained but via ports 51, 79 and 68, 80 when the grooves 66 and 74 of these valves leave the ports 55, 72 and overlap the ports 79, 80. Under these conditions, the vehicle body continues to rise beyond the so-called high or raised position, until the grooves 65, 73 of valves 40, 41 overlap the ports 85, 86 connected to the atmosphere, thus venting likewise the chambers 18, 22 to the atmosphere, whereby the slide valves 7, 8 are restored to their mean position in which the hydraulic correcting elements are isolated.

A fourth, so-called low position corresponding notably to the discharge of the hydraulic correcting elements until the rebound and beat check pads of the suspension engage each other is obtained by moving the rotary valve member 103 of selector valve 100 to position B, FIG. 6. In this position B the valve member opens the ports 106, 107 and 110 while closing port 104 of the selector valve. The vehicle body being assumed to be in its normal position, the closing of port 104 will cause the control chambers 17 and 21 to communicate with the engine induction manifold or like source of suction, while chambers 18 and 22 remain vented to the atmosphere via the ports 106, 107 and valves 40, 41.

As a result, the slide valves 7, 8 of distributor 1 are moved upwards as seen in FIG. 3, thus causing the hydraulic correcting elements to be discharged via the ducts 4, 5 leading to reservoir 3. Thus, the arms 44 controlling the rotary valve members of valves 40, 41 revolve in the direction D. Since the venting of port 110 to the atmosphere involved the venting of the vacuum reservoir 76 as well as of ports 79, 80 of valves 40, 41, the initial venting of chambers 18, 22 to the atmosphere which was established via the ports 50, 54 and 67, 71 is maintained via the ports 50, 79 and 67, 80 when the grooves 65 and 73 of the valve member leave the ports 54, 71 and overlap the ports 79, 80, chambers 17, 21 remaining connected to the engine suction, so that the desired discharge of the hydraulic correcting elements is maintained, notably until the suspension rebound or beat pads or like check members engage each other.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A device for correcting the trim of a vehicle in response to a source of vacuum wherein the suspension system of at least one axle of said vehicle comprises hydraulic correcting means, a source of hydraulic pressure, a distributor, a reservoir, said distributor connecting said pressure source to said reservoir and said correcting means, said distributor including a movable member, said member being adapted to assume a position wherein said correcting means is hydraulically isolated, said position being intermediate a charging position in which said distributor connects said pressure source to said correcting means and a discharge position in which said distributor connects said correcting means to said reservoir, an enclosure, an actuator assembly in said enclosure adapted to control said movable member, said assembly dividing said enclosure into two chambers, suction passageway means connecting each of said chambers with said vacuum source, vent passageway means connected to each of said chambers and having a first and second set of ports, a first valve interposed in said suspension system of said axle for sensing the position of the body of said vehicle above the ground, said first set of ports being positioned in said first valve, said first valve having a movable element for cooperation with said first set of ports, said movable element of said first valve acting to uncover said first set of ports in response to the sensing of a predetermined level of said body, said element acting to cover one port of said first set of ports in response to the sensing of a level of said body outside said predetermined level whereby suction is created in one of said chambers to effect movement of said movable member of said distributor from said intermediate position, said first valve being interposed in said suspension system in such a manner so that said movable member is actuated by said movable assembly to one of said positions other than said intermediate position to maintain said predetermined level of said body and a second valve adapted to effect manual actuation of said movable member, said second set of ports being positioned in said second valve, said second valve having a selector element for cooperation with said second set of ports, said selector element being adapted to move from a normal position wherein said ports are not covered to at least one position to close to the atmosphere one port of said second set of ports whereby a vacuum is created in one of said chambers causing said movable member to be actuated by said movable assembly to one of said positions other than said intermediate position to move said body from said predetermined level, said first valve having a relief passage for communication with said first set of ports of said vent passageway means upon movement of said body a predetermined distance from said predetermined level for venting said one of said chambers thereby limiting the extent of said movement of said body.

2. The device according to claim 1, wherin said selector valve is further adapted to move to another position to close to the atmosphere another one of said second set of ports whereby a vacuum is created in the other of said chambers causing said movable member to be actuated by said movable assembly to said discharge position to move said body to another level outside said predetermined level.

3. A device for correcting the trim of a vehicle in response to a source of vacuum wherein the suspension system of at least one axle of said vehicle comprises hydraulic correcting means, a source of hydraulic pressure, a distributor, a reservoir, said distributor connecting said pressure source to said reservoir and said correcting means, said distributor including a movable member, said member being adapted to assume a position wherein said correcting means is hydraulically isolated, said position being intermediate a charging position in which said distributor connects said pressure source to said correcting means and a discharge position in which said distributor connects said correcting means to said reservoir, an enclosure, an actuator assembly in said enclosure adapted to control said movable member, said assembly dividing said enclosure into two chambers, suction passageway means connecting each of said chambers with said vacuum source, vent passageway means connected to each of said chambers and having a first and second set of ports, a first valve interposed in said suspension system of said axle for sensing the position of the body of said vehicle above the ground, said first set of ports being positioned in said first valve, said first valve having a movable element for cooperation with said first set of ports, said movable element of said first valve acting to uncover said first set of ports in response to the sensing of a predetermined level of said body, said element acting to cover one port of said first set of ports in response to a level of said body outside said predetermined level whereby a vacuum is created in one of said chambers to effect movement of said movable member of said distributor from said intermediate position, said first valve being interposed in said suspension system in such a manner so that said movable member is actuated by said movable assembly to one of the other of said positions to maintain said predetermined level of said body, said first set of ports comprises a vent port for each of said two chambers, said first valve comprises an intermediate port positioned between said vent ports, means on said movable element of said first valve connecting said intermediate port with one of said chambers through said vent passageway means upon the movement of said element to close one of said vent ports, a relief port open to the atmosphere positioned in said first valve and so arranged to communicate through said connecting means with the other of said chambers after a movement greater than that required for connecting said intermediate port to said one of said chambers, and a second valve adapted to effect manual actuation of said movable member, said second valve having a selector element for cooperation with said second set of ports of said vent passageway means, said second set of ports comprising two additional vent ports and an additional intermediate port connected to said vent passageway means, said selector element being adapted to move from a normal position wherein only said intermediate port of said second set of ports is closed to the atmosphere to at least one position to close to the atmosphere at least one vent port of said second set of ports whereby a vacuum is created in one of said chambers causing said movable member to be actuated by said movable assembly to one of said positions other than said intermediate position to move said body from said predetermined level, said selector element being further adapted to move to another position wherein only one vent port and said intermediate port of said second set of ports is closed to the atmosphere whereby a vacuum is created in both chambers simultaneously after said body has moved a predetermined distance from said predetermined level.

4. The device according to claim 3, wherein is further provided a vacuum reservoir, said intermediate port of said first valve being connected to said vacuum reservoir whereby vacuum is supplied to one of said chambers through said vent passageway means after said body has moved a predetermined distance from said predetermined level.

5. The device according to claim 3, wherein the suspension system of another axle of said vehicle comprises a second hydraulic correcting means, said axles being located substantially at the front and rear of said vehicle, and wherein said device further comprises a second distributor and an actuator means for said second distributor responsive to the level of said body above the ground, said actuator means being connected to said second valve for manual control.

6. A device for correcting the trim of a vehicle in response to a source of vacuum wherein the suspension system of one axle of said vehicle comprises hydraulic correcting means, a source of hydraulic pressure, a distributor, a reservoir, said distributor connecting said pressure source to said reservoir and said correcting means, said distributor including a movable member adapted to sliding movement, said member being adapted to assume a position wherein said correcting means is hydraulically isolated, said position being intermediate a charging position in which said distributor connects said pressure source to said correcting means and a discharge position in which said distributor connects said correcting means to said reservoir, an enclosure, an actuator assembly in said enclosure adapted to control said movable member, said assembly dividing said enclosure into two chambers, suction passageway means connecting each of said chambers with said vacuum source, valve means responsive to the level of the body of the vehicle above the ground adapted to control said movable assembly, said valve means being connected to said suction passageway means and to the atmosphere, said valve means being adapted to vent one of said chamber to the atmosphere in response to the body being at said predetermined level, said valve means being further adapted to discontinue the venting of one of said chambers in response to the sensing of the movement of said body outside said predetermined level whereby a vacuum is created in said one of said chambers to effect movement of said movable member of said distributor from said intermediate position to effect return of said body to said predetermined level, said vehicle having a second axle, a second hydraulic correcting means mounted for cooperation with said second axle, said axles being located substantially at the front and rear of said vehicle, said pressure source being a pump, a second distributor having a second movable member adapted to sliding movement, said second movable member being adapted to assume a position wherein said second correcting means is hydraulically isolated, said position being intermediate a charging position in which said distributor connects said pressure source to said second correcting means and a discharge position in which said distributor connects said second correcting means to said reservoir, actuator means for said second distributor responsive to the level of said body above the ground, said movable members being adapted for sliding movement in a first and second bore, respectively, a first and second duct means formed by the respective one of said movable members and said bores, a third duct means formed by said second bore and said second movable member, said third duct means being connected with said first duct means to form a normal discharge duct when said members are in said intermediate position, said movable members being adaptable to close said discharge duct when the respective movable member is moved to said charging position.

References Cited by the Examiner
UNITED STATES PATENTS

| 1,990,517 | 2/35 | Bedford. |
|---|---|---|
| 2,427,927 | 9/47 | Schutte. |
| 2,981,551 | 4/61 | Dolza. |
| 3,031,204 | 4/62 | De Lorean _____ 280—124 |

FOREIGN PATENTS

| 670,361 | 4/52 | Great Britain. |
|---|---|---|

MILTON BUCHLER, *Primary Examiner.*

PHILIP ARNOLD, *Examiner.*